(12) United States Patent
Vlachou et al.

(10) Patent No.: US 11,202,297 B2
(45) Date of Patent: Dec. 14, 2021

(54) CENTRALIZED SPECTRUM MANAGEMENT FOR INTERFERENCE MITIGATION

(71) Applicant: HEWLETT PACKARD ENTERPRISE DEVELOPMENT LP, Houston, TX (US)

(72) Inventors: Christina Vlachou, Palo Alto, CA (US); Ioannis Pefkianakis, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 63 days.

(21) Appl. No.: 16/146,723

(22) Filed: Sep. 28, 2018

(65) Prior Publication Data
US 2020/0107214 A1 Apr. 2, 2020

(51) Int. Cl.
*H04W 72/08* (2009.01)
*H04W 28/02* (2009.01)
(Continued)

(52) U.S. Cl.
CPC ........ *H04W 72/082* (2013.01); *H04W 24/10* (2013.01); *H04W 28/0236* (2013.01);
(Continued)

(58) Field of Classification Search
None
See application file for complete search history.

(56) References Cited

U.S. PATENT DOCUMENTS

| 7,929,508 B1 | 4/2011 | Yucek et al. |
| 9,264,925 B2 | 2/2016 | Zhao et al. |

(Continued)

FOREIGN PATENT DOCUMENTS

| CN | 101084636 A | 12/2007 |
| CN | 102388591 A | 3/2012 |

(Continued)

OTHER PUBLICATIONS

Christina Vlachou et al., "LTERadar", Proceedings of the ACM on Measurement and Analysis of Computing Systems, ACM, 2 Penn Plazza, Suite 701, New York, NY 10121-8701 USA, vol. 2, No. 2, Jun. 13, 2018, pp. 1-31 (Year: 2018).*

(Continued)

*Primary Examiner* — Joseph A Bednash
(74) *Attorney, Agent, or Firm* — Hewlett Packard Enterprise Patent Department

(57) ABSTRACT

Systems and methods described herein provide a centralized solution for interference mitigation that focuses on efficient spectrum management. Wireless Access Points (APs) collect interference measurements for wireless channels and generate corresponding interferer airtime estimates. The APs also determine Packet Error Rates (PERs) for wireless client devices currently being served via the channels by the APs. The APs send the interferer airtime measurements and the PERs to a centralized controller. If an interferer airtime estimate and a PER for a particular channel satisfy predefined threshold conditions, the controller modifies an allocation of wireless bandwidth for an AP that is currently using the channel and sends a message to the AP indicating how the allocation has been modified.

13 Claims, 5 Drawing Sheets

(51) Int. Cl.
*H04W 28/04* (2009.01)
*H04W 88/10* (2009.01)
*H04W 24/10* (2009.01)

(52) U.S. Cl.
CPC ....... *H04W 28/0247* (2013.01); *H04W 28/04* (2013.01); *H04W 88/10* (2013.01)

(56) References Cited

U.S. PATENT DOCUMENTS

| | | | |
|---|---|---|---|
| 9,510,222 | B2 | 11/2016 | Yerramalli et al. |
| 9,532,243 | B2 | 12/2016 | Kim et al. |
| 9,668,263 | B1 | 5/2017 | Tkach et al. |
| 9,736,703 | B2 | 8/2017 | Goldsmith et al. |
| 2006/0014536 | A1 | 1/2006 | Demirhan et al. |
| 2008/0137545 | A1* | 6/2008 | Shiue .......... H04W 36/30 370/250 |
| 2011/0021153 | A1 | 1/2011 | Safavi |
| 2011/0243021 | A1* | 10/2011 | Ponnuswamy ........ H04L 41/22 370/252 |
| 2011/0317647 | A1 | 12/2011 | Cho et al. |
| 2012/0314598 | A1 | 12/2012 | Sadek et al. |
| 2013/0272285 | A1* | 10/2013 | Goldsmith .......... H04W 24/02 370/338 |
| 2014/0064067 | A1 | 3/2014 | Drewes et al. |
| 2015/0056931 | A1 | 2/2015 | Yerramalli et al. |
| 2015/0131536 | A1 | 5/2015 | Kaur et al. |
| 2015/0208253 | A1 | 7/2015 | Kim et al. |
| 2015/0304872 | A1 | 10/2015 | Sadek |
| 2016/0007378 | A1 | 1/2016 | Bertorelle et al. |
| 2016/0174233 | A1 | 6/2016 | Emmanuel et al. |
| 2017/0048838 | A1 | 2/2017 | Chrisikos et al. |
| 2017/0085326 | A1 | 3/2017 | Li et al. |
| 2017/0147940 | A1 | 5/2017 | Mitola, III |
| 2017/0164364 | A1 | 6/2017 | Song et al. |
| 2017/0215102 | A1* | 7/2017 | Hassan ................. H04W 28/04 |
| 2017/0264487 | A1 | 9/2017 | Scahill et al. |
| 2017/0272966 | A1 | 9/2017 | Scahill et al. |
| 2017/0273109 | A1 | 9/2017 | Babaei et al. |
| 2018/0212827 | A1* | 7/2018 | Eryigit .................. H04W 16/18 |

FOREIGN PATENT DOCUMENTS

| | | |
|---|---|---|
| CN | 102687420 A | 9/2012 |
| WO | 2007/055531 A2 | 5/2007 |
| WO | 2014/138645 A1 | 9/2014 |
| WO | 2017/112001 A1 | 6/2017 |

OTHER PUBLICATIONS

European Search Report Received for EP Patent Application No. 19170913.8, dated Aug. 30, 2019, 10 pages.
Imtiaz Parvez et al: "CBRS Spectrum Sharing between LTE-U and Wi Fi: A Multiarmed Bandit Approach", Journal of Mobile Information Systems, vol. 2016, Jan. 1, 2016, 13 pages.
Michael Olbrich et al.: "Towards LTE-U Interference Detection, Assessment and Mitigation in 882. 11 Networks using Commodity Hardware", Feb. 2017, 13 pages.
Zeng et al., "A first look at 802.11ac in action: Energy efficiency and interference characterization", In 2014 IFIP Networking Conference, Jun. 2014, pp. 1-9.
Yun et al., "Supporting WiFi and LTE Co-existence," In IEEE INFOCOM'15, 9 pages.
Yu et al., "Auction-Based Coopetition Between LTE Unlicensed and Wi-Fi", In IEEE Journal on Selected Areas in Communications, vol. 35, pp. 79-90, 2017, 12 pages.
Voicu et al., "Coexistence of Pico- and Femto-cellular LTE-unlicensed with Legacy Indoor Wi-Fi Deployments", IEEE International Conference on Communication Workshop (ICCW), Workshop on LTE in Unlicensed Bands: Potentials and Challenges, 2015, pp. 10041-10047.
T-Mobile Newsroom, "T-Mobile Continues to Boost Capacity for Customers with LTE-U Launching in Spring 2017", (webpage), available online at <https://web.archive.org/web/20170222212601/ https://newsroom.t-mobile.com/news-and-blogs/lte-u-launch.htm>, Feb. 22, 2017, 2 pages.
Sur et al., "Practical MU-MIMO User Selection on 802.11Ac Commodity Networks", In ACM MOBICOM'16, 13 pages.
Sheshadri et al., "BLU: Blue-printing Interference for Robust LTE Access in Unlicensed Spectrum", CoNEXT '17, Proceedings of the 13th International Conference on emerging Networking EXperiments and Technologies, Dec. 12-15, 2017, Incheon, Republic of Korea, 13 pages.
Rayanchu et al., "Fluid: improving throughputs in enterprise wireless lans through Flexible channelization", Mobile Computing, IEEE Transactions on, vol. 11, No. 9, 2012, pp. 1455-1469.
Rayanchu et al., "Catching whales and minnows using WiFiNet: deconstructing non-WiFi interference using WiFi hardware", In Proceedings of USENIX NSDI, 2012, 14 pages.
Rayanchu et al., "Airshark: detecting non-WiFi RF devices using commodity WiFi hardware", In Proceedings of ACM Internet Measurement Conference (IMC), 2011, pp. 137-154.
Pefkianakis et al., "MIMO Rate Adaptation in 802.11N Wireless Networks", In ACM MOBICOM'10, available online at <http:// metro.cs.ucla.edu/papers/Pefkianakis.MOBICOM10.pdf>, 10 pages.
Olbrich et al., "WiPLUS: Towards LTE-U Interference Detection, Assessment and Mitigation in 802.11 Networks", In European Wireless 2017 (EW2017), 2017, 8 pages.
Martha DeGrasse, "Verizon starts nationwide LAA deployment", (webpage), available online at <https://www.rcrwireless.com/ 20170804/carriers/verizon-starts-nationwide-laa-deployment-tag4>, Aug. 4, 2017, 5 pages.
Makris et al., "Measuring lte and wifi coexistence in unlicensed spectrum", In 2017 European Conference on Networks and Communications (EuCNC), Jun. 2017, pp. 1-6.
Julius Knapp., "OET Authorizes First LTE-U devices", available online at <https://www.fcc.gov/news-events/blog/2017/02/22/oet-authorizes-first-lte-u-devices>, 2 pages.
Jindal et al., LTE and Wi-Fi in Unlicensed Spectrum: A Coexistence Study, Google whitepaper, 2015, 25 pages.
Jian et al., "Coexistence of Wi-Fi and LAA-LTE: Experimental evaluation, analysis and insights", In IEEE ICCW'15, 8 pages.
Guan et al., "CU-LTE: Spectrally-Efficient and Fair Coexistence Between LTE and Wi-Fi in Unlicensed Bands", In IEEE INFOCOM'16, 9 pages.
Giupponi et al., "Simulating LTE and Wi-Fi Coexistence in Unlicensed Spectrum with ns-3", available online at <https://arxiv.org/ ftp/arxiv/papers/1604/1604.06826.pdf>, 12 pages.
Frederic Firmin, 3GPP MCC, "The Evolved Packet Core", available online at <https://web.archive.org/web/20170509040250/http://www. 3gpp.org/technologies/keywords-acronyms/100-the-evolved-packet-core> May 9, 2017, 3 pages.
Extended European search report and Search Opinion Received for EP Application No. 18195827.3, dated Feb. 28, 2019, 9 pages.
Dino Flore, "3GPP & unlicensed spectrum", IEEE 802 Interim Session, Atlanta, Jan. 11-16, 2015, 17 pages.
Christina Vlachou et al: "LTERadar", Proceedings of the ACM on Measurement and Analysis of Computing Systems, ACM, 2 Penn Plaza, Suite 701New YorkNY10121-8701USA, vol. 2, No. 2, Jun. 13, 2018 (Jun. 13, 2018), pp. 1-31.
Chai et al., "LTE in unlicensed spectrum: are we there yet?", MobiCom '16 Proceedings of the 22nd Annual International Conference on Mobile Computing and Networking, 2016, pp. 135-148.
Capretti et al., "LTE/Wi-Fi Co-existence Under Scrutiny: An Empirical Study", Proceedings of the Tenth ACM International Workshop on Wireless Network Testbeds, Experimental Evaluation, and Characterization, 2016, pp. 33-40.
Brenner et al., "Technical response to parties opposed to LTE unlicensed", In Qualcomm TR, 2015, 29 pages.
Anwar et al., "Loss differentiation: Moving onto high-speed wireless LANs", IEEE INFOCOM 2014—IEEE Conference on Computer Communications, 2014, pp. 2463-2471.
André Cavalcante et al., "Performance Evaluation of LTE and Wi-Fi Coexistence in Unlicensed Bands", In IEEE VTC'13, 7 pages.

(56) References Cited

OTHER PUBLICATIONS

Abinader et al., "Enabling the coexistence of lte and wi-fi in unlicensed bands", IEEE Communications Magazine, vol. 52, Issue: 11, Nov. 2014, pp. 54-61.
"Spectrum Analysis" Chapter 34, Aruba Networks, available online at <https://web.archive.org/web/20170916204310/https://www.arubanetworks.com/techdocs/ArubaOS_61/ArubaOS_61_UG/Spectrum_Analysis.php>, Sep. 16, 2017, 46 pages.
"Spectrum Analysis Overview", (webpage), Cisco-Meraki, available online at <https://web.archive.org/web/20160813010042/https://documentation.meraki.com/MR/Radio_Settings/Spectrum_Analysis_Overview>, Aug. 13, 2016, 2 pages.
"OpenEPC", available online at <https://web.archive.org/web/20170925015825/http://openepc.com/>, 2017, 3 pages.
"LTE-U Forum", available online at <https://web.archive.org/web/20170526112059/http://www.lteuforum.org/>, May 26, 2017, 1 page.
"3GPP Release 13" available online at <https://www.etsi.org/deliver/etsi_en/301800_301899/301893/02.00.07_20/en_301893v020007a.pdf>, accessed Dec. 22, 2017, 123 pages.
Milosevic, N. et al.; "LTE and Wi-Fi Co-existence in 5 GHZ Unlicensed Band"; Sep. 2017; 11 pages.
Qualcomm Technologies, Inc.; "LTE in Unlicensed Spectrum"; Jun. 2014; 19 pages.
Sagari, S.S., Models and Algorithms for Spectrum Coexistence in Wireless Networks, (Research Paper), May 2016, 109 Pgs.
Ahmed, N. et al., Interference Mitigation in Enterprise WLANS Through Speculative Scheduling, (Research Paper), Proceedings of the 13th Annual ACM International Conference on Mobile Computing and Networking, Sep. 9, 2007, pp. 342-345.

* cited by examiner

CENTRALIZED SPECTRUM MANAGEMENT FOR INTERFERENCE MITIGATION

BACKGROUND

Wireless networks provide computing devices, such as mobile phones and laptop computers, convenient access to the Internet and other networking resources. Some wireless networks, such as Wi-Fi networks, allow wireless communication over between devices and Access Points (APs) over relatively short distances (e.g., up to 160 feet indoors or up to 300 feet outdoors). Other wireless networks, such as cellular networks that comply with the Long Term Evolution (LTE) standard, allow wireless communication over larger distances (e.g., tens of miles). Often, multiple Wi-Fi networks and cellular networks serve a single geographical area. Wi-Fi often coexists with other interferers in 2.4 GHz (Bluetooth, microwave ovens) or 5 GHz (LTE in unlicensed, cordless phones).

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

In recent years, to meet an increasing demand for wireless communication in densely populated areas, many LTE networks are being configured to operate in an unlicensed 5 gigahertz (GHz) wireless spectrum band when conditions are suitable in order to increase overall capacity. However, many Wi-Fi networks (e.g., wireless local area networks) are also configured to operate in the 5 GHz band. Notably, Third Generation Partnership Project (3GPP) standardization licensed assisted access (LAA) uses the same channels as Wi-Fi.

Unfortunately, LTE systems and Wi-Fi systems cannot decode each other's radio frames. LTE and Wi-Fi have different channelization protocols, different administrative domains, and different capabilities for sensing interference. LTE hidden terminals cause severe performance degradation for Wi-Fi systems, as LTE does not respect Wi-Fi control frames.

Many types of LTE protocols, such as LTE-unlicensed (LTE-U) and licensed assisted access (LAA), provide techniques that facilitate coexistence between LTE networks and Wi-Fi networks. However, despite the existing approaches for allowing LTE networks and Wi-Fi networks to operate concurrently in the 5 GHz range, the performance of Wi-Fi network will still suffer when an LTE network with an overlapping service area operates in the 5 GHz range. In areas where APs are densely deployed, interference from LTE transmissions can be particularly problematic.

Recent amendments to the Institute of Electrical and Electronics Engineers (IEEE) 802.11ax/ac standard propose dynamic bandwidth adaptation on almost per-packet basis. However, in many scenarios, interferers (e.g., LTE small cells, etc.) are hidden or are on secondary Wi-Fi channels and are therefore difficult for an AP to detect.

One approach that can assist Wi-Fi systems to detect LTE interference is described in U.S. patent application Ser. No. 15/962,722, entitled "LTE Interference Detection and Mitigation for Wi-Fi Links," which is hereby incorporated by reference. A related approach that can be used to classify high-frequency radio signals is described in U.S. patent application Ser. No. 15/718,491, entitled "High Frequency Radio Signal Classifications," which is also hereby incorporated by reference.

Systems and methods disclosed herein provide a centralized solution for interference mitigation that focuses on efficient spectrum management. The solutions described herein leverage existing spectrum monitor tools found in some APs. When used to mitigate LTE interference in unlicensed bands, the systems described herein can achieve throughput gains that exceed one hundred percent.

Figure 1:
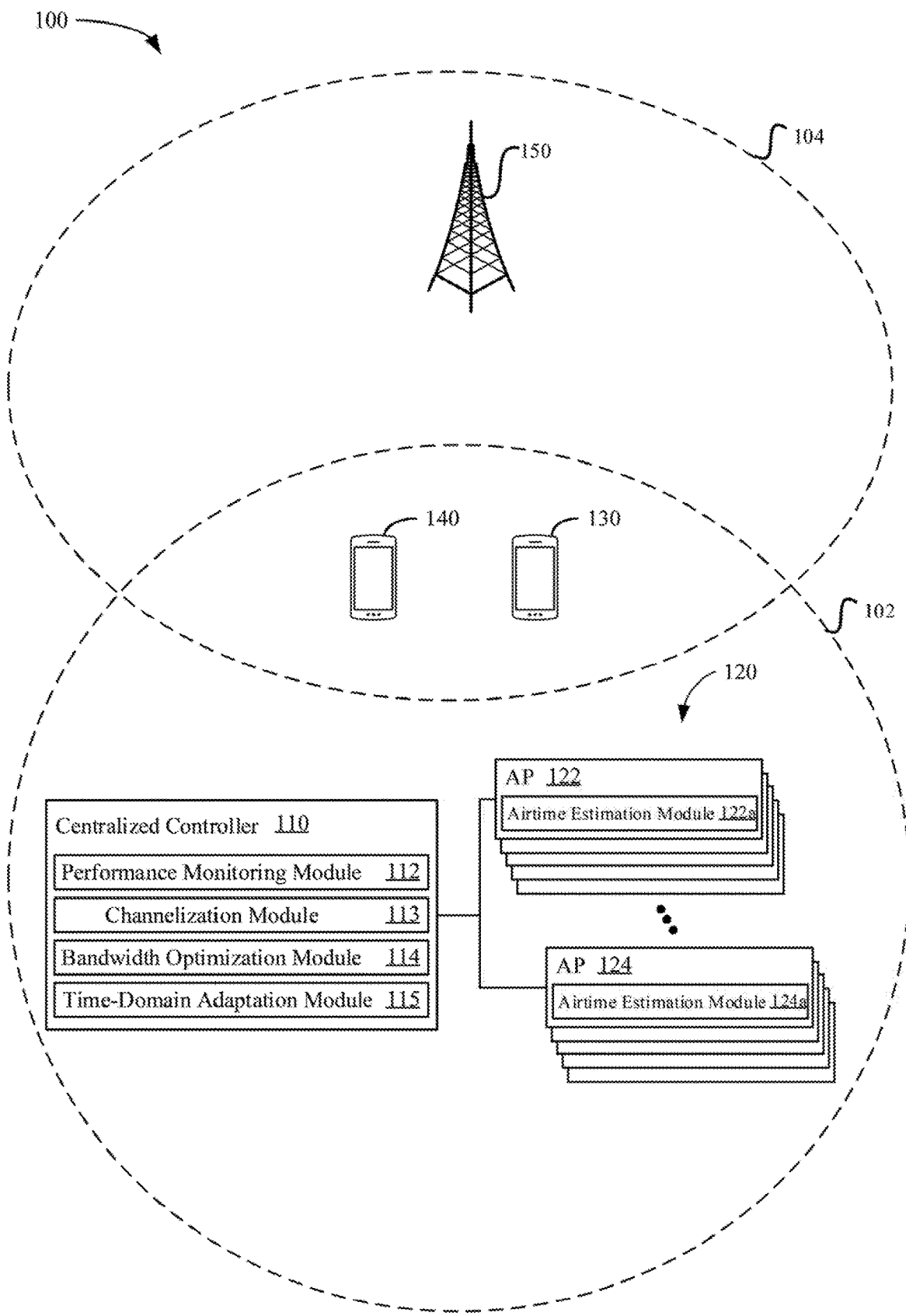
FIG. 1 illustrates a computing environment in which systems of the present disclosure may operate, according to one example.

FIG. 1 illustrates a computing environment 100 in which systems of the present disclosure may operate, according to one example. As shown, APs 120, such as AP 122 and AP 124, are in communication with a centralized controller 110. The APs 120 may convert data received from a wired network (not shown) into radio signals and transmit the radio signals. Also, the APs 120 may convert received radio signals into data and forward the data to the wired network.

At any given time, each of the APs 120 may operate in a spectrum monitor mode or in a hybrid mode that uses spectral sampling to detect interference. For the purposes of this example, suppose AP 124 is operating in a spectrum monitor mode. While in the spectrum monitor mode, the AP 124 does not send wireless transmissions to client devices. Instead, the AP 124 focuses on monitoring multiple wireless channels to detect and measure interference levels for each channel.

Also, suppose that the AP 122 is operating in a hybrid mode. While in the hybrid mode, the AP 122 splits time between transmitting to (and receiving transmissions from) the client device 130 on a current wireless channel and monitoring the current channel to measure interference levels. The APs 120 that are in hybrid mode (e.g., AP 122) provide wireless service in the 5 GHz spectrum to client devices within the service area 102 (e.g., the client device 130). The centralized controller 110 determines wireless bandwidth allocations in the 5 GHz spectrum for the APs 120 that are in hybrid mode and coordinates those allocations to ensure that the APs 120 do not unduly interfere with each other (e.g., by ensuring that channels allocated to APs serving different clients do not overlap). While in the spectrum monitor mode, the AP 124 keeps track of the current airtime state for each 20 megahertz (MHz) section within the 5 GHz spectrum that the centralized controller 110 may allocate for wireless communications within the service area 102. Each 20 MHz section may represent a primary channel or a secondary channel. Similarly, while in the hybrid mode, the AP 122 keeps track of the current airtime state for each 20 MHz section that is currently allocated to the AP 122 (e.g., a primary channel plus any allocated secondary channels).

Specifically, in order to generate an interferer airtime estimate for a specific interferer on a particular wireless channel (i.e., the airtime or duty cycle that an interferer consumes on the channel), an airtime estimation module executing at an AP can calculate an exponential moving average of interferer airtime measurements collected at that AP over a channel-scan period. For each of the APs 120, the length of the channel-scan period over which measurements are collected may be based on the mode in which the AP is currently operating. For example, since the AP 122 is in hybrid mode and focuses on a relatively small number of channels (e.g., a single primary channel and possibly several secondary channels), the airtime estimation module 122a executing at the AP 122 may collect more measurements for those channels over the same period of time than the airtime estimation module 124a executing at the AP 124 (which is collecting measurements for a much larger number of channels). For this reason, the airtime estimation module 122a may calculate the exponential moving averages using measurements taken over a shorter channel-scan period than the airtime estimation module 124a.

In one example, the interferer airtime estimate $E_{x,t}$ for a particular wireless channel x at a time t may be calculated as an exponential moving average according to the following equation:

$$E_{x,t} = \begin{cases} m_1, & t = 1 \\ \alpha \cdot m_t + (1-\alpha) \cdot E_{x,t-1}, & t > 1 \end{cases},$$

where $m_1$ is an initial measurement for channel x, $m_t$ is a measurement taken for channel x at time t, $E_{x,t-1}$ is the interferer airtime estimate at time t−1, and a is a constant real-valued coefficient between zero and one that represents a degree of weighting decrease for previous observations. In one example, the coefficient is set to 0.25 for APs in the spectrum monitor mode (e.g., AP 124) and set to 0.5 for APs in the hybrid mode (e.g., AP 122).

Each of the APs 120 that is operating in hybrid mode also estimates a packet error rate (PER) for client devices that are being served. Thus, while AP 122 is serving client device 130, the AP 122 keeps track of the PER for the client device 130. The APs 120 can report the interferer airtime estimates and PER estimates to the centralized controller 110. The centralized controller 110 can dynamically reallocate bandwidth for the APs 120 based on this information, as is described in greater detail below.

Suppose a cellular radio access node 150 (e.g., an evolved Node B, a low-power radio access node, or a remote radio head) provides wireless service to cellular devices within the service area 104, such as the client device 140. Since the service area 102 and the service area 104 overlap, wireless transmissions between the cellular radio access node 150 and the client device 140 may interfere with wireless transmissions between the AP 122 and the client device 130. Also suppose the centralized controller 110 is unable to coordinate bandwidth allocations with the cellular radio access node 150 directly.

In this scenario, the airtime estimation module 122a executing at the AP 122 reports an airtime interference estimate to the centralized controller 110 for a channel the AP 122 is using to communicate wirelessly with the client device 130. The performance monitoring module 112 executing at the centralized controller 110 determines whether the airtime interference estimate satisfies a predefined airtime-threshold condition. In one example, the predefined airtime-threshold condition is that the interferer airtime estimate indicates an interferer was transmitting on the wireless channel during at least half of a channel-scan period for which the airtime estimation module 122a calculated the interferer airtime estimate.

In addition, the AP 122 can also report a PER estimate for the client device 130 to the centralized controller 110. The performance monitoring module 112 determines whether the PER estimate satisfies a PER-threshold condition. In one example, the PER-threshold condition is that the PER estimate is greater than 50 percent.

If the airtime-threshold condition and the PER-threshold condition are satisfied, the performance monitoring module 112 proceeds to determine whether the channel is a primary channel or a secondary (i.e., extension) channel. If the channel is primary, the performance monitoring module 112 triggers the channelization module 113 executing at the central controller 110. The channelization module 113 deallocates the channel from the AP 122 and signals the AP 122 to move to another channel.

However, if the channel is secondary, the performance monitoring module 112 triggers the bandwidth optimization module 114 executing at the central controller 110. The bandwidth optimization module 114 determines a bandwidth-switching score to ascertain whether reducing the bandwidth without changing the primary channel will result in an increase in throughput. Specifically, the bandwidth optimization module 114 may divide the interferer airtime estimate by the quotient of a prospective bandwidth for the AP and a current bandwidth for the AP. The prospective bandwidth is narrower than the current bandwidth. Mathematically, the bandwidth-switching score R can be defined by the following equation:

$$R = \frac{E_{x,t}}{\left(\frac{B_p}{B_c}\right)},$$

where $B_p$ is the prospective bandwidth and $B_c$ is the current bandwidth. If the bandwidth switching score satisfies a predefined score-threshold condition, the centralized controller 110 sends a message to the AP 122 to indicate that the allocation for the AP 122 has been changed from the current bandwidth to the prospective bandwidth (though the primary channel remains unchanged). In one example, the predefined score-threshold condition is that the bandwidth-switching score is greater than or equal to one. However, if the predefined score-threshold condition is not satisfied, the centralized controller 110 refrains from changing the current bandwidth (e.g., because changing to the prospective bandwidth would not improve throughput).

The time-domain adaptation module 115 also executes at the centralized controller 110 and serves several purposes. First, the time-domain adaptation module 115 tracks how much time has passed since the centralized controller 110 last changed the bandwidth allocation for the AP 122. If less than the length of two channel-scan periods has passed since the bandwidth allocation for the AP 122 has changed, the time-domain adaptation module 115 prevents the centralized controller 110 from changing the bandwidth allocation for the AP 122. When at least two channel-scan periods have passed, the time-domain adaptation module 115 again allows changes to the bandwidth allocation for the AP 122. By operating in this manner, the time-domain adaptation module 115 prevents oscillations between different channels or bandwidths.

In addition, when the time-domain adaptation module 115 detects that two channel-scan periods have elapsed since the bandwidth allocation for the AP 122 was modified, the time-domain adaptation module 115 allows any bandwidth sections that were deallocated by the modification to be reallocated. This ensures that sections of bandwidth that were deallocated because of interference will be used again promptly once the interference subsides.

Figure 2:
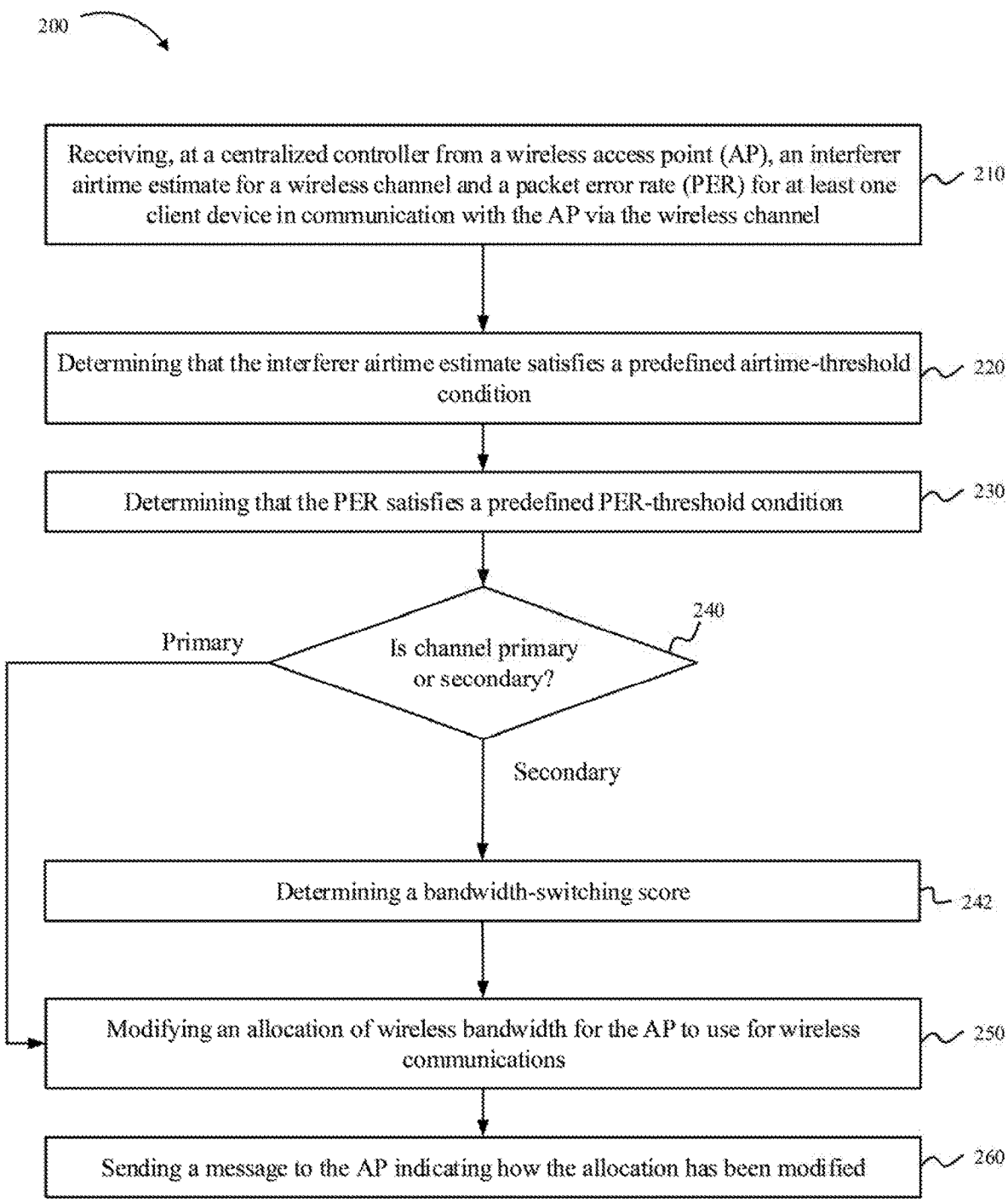
FIG. 2 illustrates functionality for a centralized controller as described herein, according to one example.

FIG. 2 illustrates functionality 200 for a centralized controller as described herein, according to one example. The functionality 200 may be implemented as a method or can be executed as instructions on a machine (e.g., by one or more processors), where the instructions are included on at least one computer-readable storage medium (e.g., a transitory or non-transitory computer-readable storage medium). While only seven blocks are shown in the functionality 200, the functionality 200 may include other actions described herein. Also, some of the blocks shown in the functionality 200 may be omitted without departing from the spirit and scope of this disclosure.

As shown in block 210, the functionality 200 includes receiving, at a centralized controller from a wireless access point (AP), an interferer airtime estimate for a wireless channel and a packet error rate (PER) for at least one client device in communication with the AP via the wireless channel. In one example, the interferer airtime estimate is an exponential moving average of measurements collected at the AP over a channel-scan period of a predefined length.

As shown in block 220, the functionality 200 includes determining that the interferer airtime estimate satisfies a predefined airtime-threshold condition. In one example, the predefined airtime-threshold condition is that the interferer airtime estimate indicates an interferer was transmitting on the wireless channel during at least half of a channel-scan period for which the AP calculated the interferer airtime estimate.

As shown in block 230, the functionality 200 includes determining that the PER satisfies a predefined PER-threshold condition. In one example, the PER-threshold condition is that the PER is greater than 50 percent.

As shown in block 240, the functionality 200 includes determining whether the wireless channel is primary or secondary.

If the wireless channel is secondary, the flow of functionality 200 proceeds to block 242. As shown in block 242, the functionality 200 includes determining a bandwidth-switching score by dividing the interferer airtime estimate by a quotient of a prospective bandwidth for the AP and a current bandwidth for the AP. The prospective bandwidth is narrower than the current bandwidth.

As shown in block 250, the functionality 200 includes modifying an allocation of wireless bandwidth for the AP to use for wireless communications based on the determination of whether the wireless channel is primary or secondary and based on the satisfaction of the airtime-threshold condition and the satisfaction of the PER-threshold condition. Specifically, if the wireless channel is primary, modifying the allocation of wireless bandwidth for the AP comprises deallocating the wireless channel from the AP and allocating a different wireless channel to the AP.

As shown in block 260, the functionality 200 includes sending a message to the AP indicating how the allocation has been modified. Specifically, if the wireless channel is secondary, the functionality 200 includes: upon determining that the bandwidth-switching score meets a predefined score-threshold condition, sending the message to the AP to indicate that the allocation has been changed from the current bandwidth to the prospective bandwidth. In one example, the predefined score-threshold condition is that the bandwidth-switching score is greater than or equal to one.

The functionality 200 may also include: upon detecting that an amount of time equal to two multiplied by the predefined length channel-scan period has elapsed since the channel-scan period ended, reallocating a section of the wireless bandwidth that was deallocated by the modification.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

As used herein, the term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. A processor may, for example, include single or multiple cores on a chip, multiple cores across multiple chips, multiple cores across multiple devices, or suitable combinations thereof. A processor may be functional to fetch, decode, and execute instructions as described herein.

Figure 3:
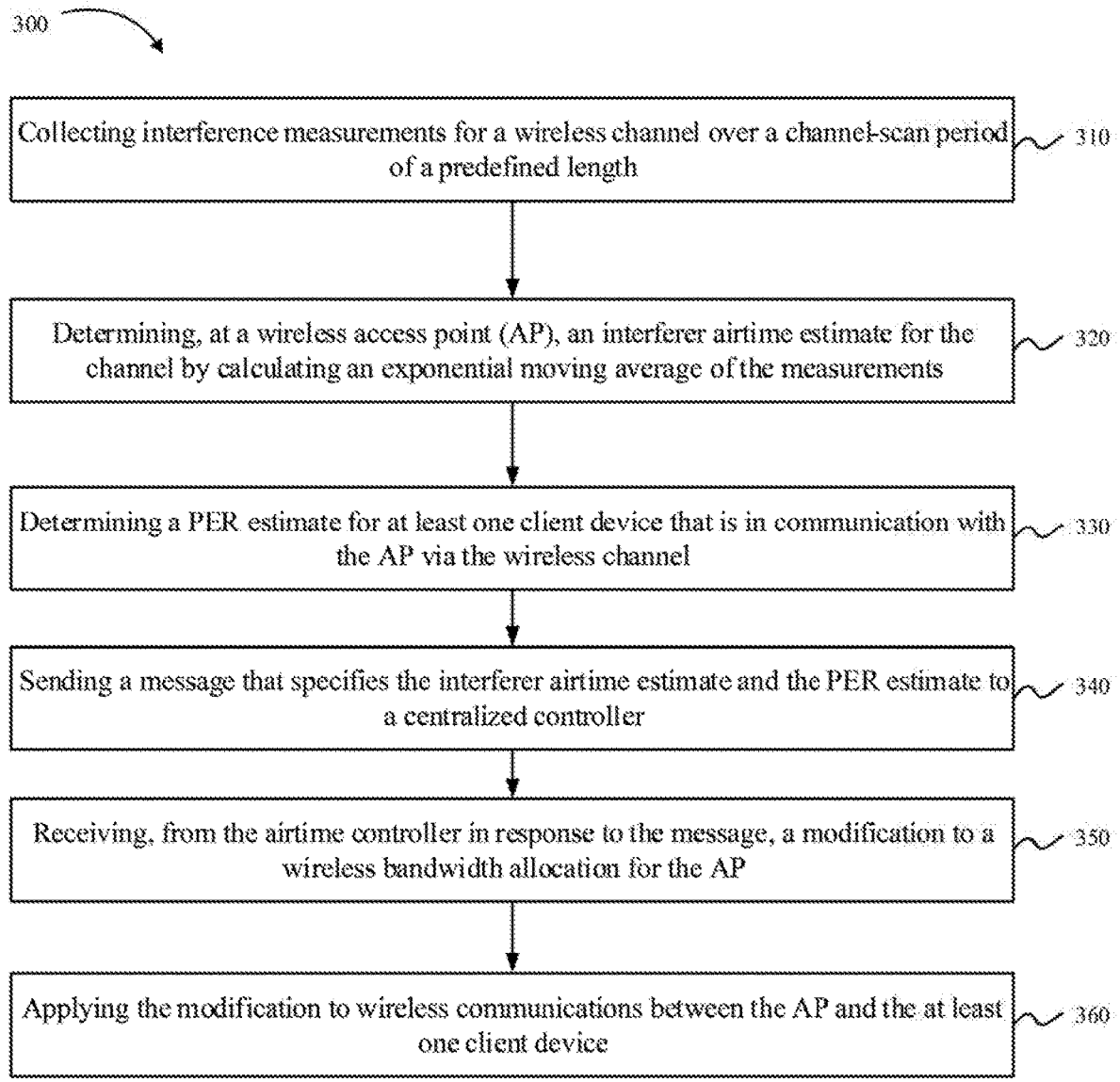
FIG. 3 illustrates functionality for an access point (AP) as described herein, according to one example.

FIG. 3 illustrates functionality 300 for an AP as described herein, according to one example. The functionality 300 may be implemented as a method or can be executed as instructions on a machine (e.g., by one or more processors), where the instructions are included on at least one computer-readable storage medium (e.g., a transitory or non-transitory computer-readable storage medium). While only six blocks are shown in the functionality 300, the functionality 300 may include other actions described herein. Also, some of the blocks shown in the functionality 300 may be omitted without departing from the spirit and scope of this disclosure.

As shown in block 310, the functionality 300 includes collecting interference measurements for a wireless channel over a channel-scan period of a predefined length.

As shown in block 320, the functionality 300 includes determining, at a wireless access point (AP), an interferer airtime estimate for the channel by calculating an exponential moving average of the measurements. In one example, a quantity equal to the interferer airtime estimate divided by a quotient of the reduced bandwidth and the current bandwidth for the AP is greater than or equal to one. Also, in one example, the interferer airtime estimate indicates that an interferer was transmitting on the wireless channel during at least half of the channel-scan period.

As shown in block 330, the functionality 300 includes determining a PER estimate for at least one client device that is in communication with the AP via the wireless channel. In one example, the PER estimate is greater than 50 percent.

As shown in block 340, the functionality 300 includes sending a message that specifies the interferer airtime estimate and the PER estimate to a centralized controller.

As shown in block 350, the functionality 300 includes receiving, from the airtime controller in response to the message, a modification to a wireless bandwidth allocation for the AP.

As shown in block 360, the functionality 300 includes applying the modification to wireless communications between the AP and the at least one client device. If the wireless channel is a secondary channel, applying the modification may comprise reducing a current bandwidth used by the AP for wireless communications without changing a primary channel on which the AP is currently operating. If the wireless channel is a primary channel, applying the modification may comprise switching to a different primary channel.

The functionality 300 may also comprise, after an amount of time equal to two multiplied by the predefined length channel-scan period has elapsed since the channel-scan period ended, receiving a message from the centralized controller reallocating a section of the wireless bandwidth to the AP that was deallocated from the AP by the modification. Also, the functionality 300 may comprise transmitting a wireless communication to the client device via the section of the wireless bandwidth.

Figure 4:
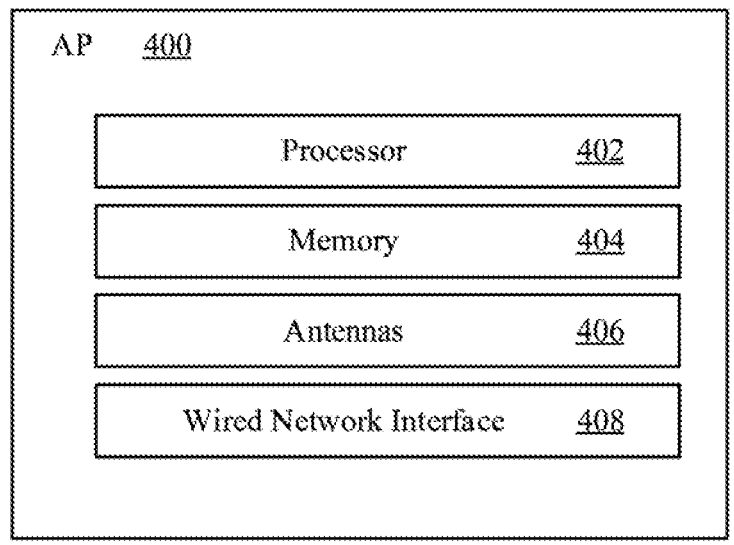
FIG. 4 is a block diagram of an access point (AP) that may be used in systems described herein, according to one example.

FIG. 4 is a block diagram of an AP 400 that may be used in systems described herein, according to one example. As shown, the AP 400 includes a processor 402, a memory 404, antennas 406, and a wired network interface 408. The AP 400 is configured to transmit radio signals to client devices and also to receive responses from the client devices via the antennas 406. The AP 400 is also connected to a centralized controller (e.g., comprising a router and/or a switch) via the wired network interface 408. The AP 400 can receive communications wirelessly from multiple client devices and forward those communications to other network devices via the wired network interface 408. Also, the AP can receive wireless communications destined for the client devices via the wired network interface 408 and send those communications to the client devices via the antennas 406. The processor 402 executes software stored in the memory 404 to interpret radio signals received via the antennas 406 and wired signals received via the wired network interface 408.

The processor 402 also executes an airtime estimation module (e.g., similar to airtime estimation module 122a described above). The APs 400 may operate in a spectrum monitor mode or in a hybrid mode. While in the spectrum monitor mode, the AP 400 does not send wireless transmissions to client devices. Instead, the AP 400 focuses on monitoring multiple wireless channels to detect and measure interference levels for each channel. When the AP 400 is in the spectrum monitor mode, the airtime estimation module determines interferer airtime estimates (e.g., duty cycles) for each channel in a region of bandwidth from which the AP 400 can allocate channels for wireless communication. Specifically, the AP 124 keeps track of the current airtime state for each 20 megahertz (MHz) section within a 5 GHz spectrum that may be allocated for wireless communications within a geographical area served by the AP 400. Each 20 MHz section may represent a primary channel or a secondary channel.

When the AP 400 operates in hybrid mode, the AP 400 communicates wirelessly with client devices via the antennas 406 using channels that are allocated to those client devices, respectively. However, when the AP 400 is in the hybrid mode, the AP 400 generally does not monitor each 20 MHz section within the 5 GHz spectrum. Instead, the AP 400 keeps track of the current airtime state for each 20 MHz section that is currently allocated to the AP 400 (e.g., a primary channel for each client plus any allocated secondary channels). Hence, while the AP 400 is in the hybrid mode, the airtime estimation module determines interferer airtime estimates (e.g., duty cycles) for each channel that is currently allocated to the AP 400 and/or the client devices the AP 400 is currently serving.

In order to generate an interferer airtime estimate for a specific interferer on a particular wireless channel, the airtime estimation module can calculate a moving average (e.g., an exponential moving average) of interferer airtime measurements collected at the AP 400 over a channel-scan period. The length of the channel-scan period over which measurements are collected may is based on the mode in which the AP 400 is currently operating. When the AP 400 is in hybrid mode, the airtime estimation module collects measurements at a faster rate for each channel being scanned because the AP 400 is scanning fewer channels overall. By contrast, when the AP 400 is in spectrum monitor mode, the airtime estimation module collects measurements at a slower rate for each channel because more channels are being scanned. For this reason, when the AP 400 is in the spectrum monitor state, the airtime estimation module may calculate the moving averages using measurements taken over a longer channel-scan period than when the AP 400 is in the hybrid mode. If the interferer airtime estimates are exponential moving averages (e.g., as described with respect to FIG. 1), the value of the coefficient $\alpha$ is can be set to 0.25 when the AP 400 is in the spectrum monitor mode and set to 0.5 when the AP 400 in the hybrid mode.

Also, when the AP 400 operates in hybrid mode, the AP 400 also estimates a packet error rate (PER) for client devices that are being served. The AP 400 can report the interferer airtime estimates and PER estimates to the centralized controller via the wired network interface 408. In response, the AP 400 may receive a message from the centralized controller that modifies bandwidth allocations for client devices currently being served by the AP 400 to mitigate the effects of interference. When the AP 400 receives such a message, the AP 400 modifies its wireless communications with the client devices accordingly.

Figure 5:
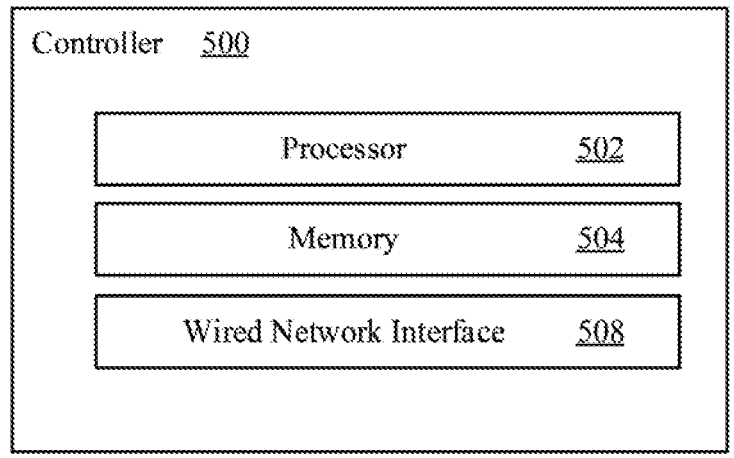
FIG. 5 is a block diagram of a controller that may be used in systems described herein, according to one example.

FIG. 5 is a block diagram of a controller 500 that may be used in systems described herein, according to one example. As shown, the controller 500 includes a processor 502, a memory 504, and a wired network interface 508. The controller 500 is configured to communicate with one or more APs via the wired network interface 408. The APs report interferer airtime estimates for channels in the 5 GHz spectrum and PE estimates for current wireless client devices to the controller 500 via the wired network interface 500. The controller 500 analyzes the interferer airtime estimates and the PER estimates, then sends messages to the APs to modify bandwidth allocations based on the analysis.

Specifically, the processor 502 executes a performance monitoring module stored in the memory 504. When an interferer airtime estimate for a particular channel is received at the controller 500, the performance monitoring module determines whether the airtime interference estimate satisfies a predefined airtime-threshold condition. In one example, the predefined airtime-threshold condition is that the interferer airtime estimate indicates an interferer was transmitting on the wireless channel during at least half of a channel-scan period over which the interferer airtime estimate was calculated.

Also, when a PER estimate for a client device to which the channel is allocated is received at the controller 500, the performance monitoring module determines whether the PER estimate satisfies a PER-threshold condition. In one example, the PER-threshold condition is that the PER estimate is greater than 50 percent.

If the airtime-threshold condition and the PER-threshold condition are satisfied, the performance monitoring module proceeds to determine whether the channel is a primary channel or a secondary (i.e., extension) channel. If the channel is primary, the performance monitoring module triggers a channelization module that is also stored in the memory 504 and executed by the processor 502. The channelization module deallocates the channel from the client device and signals the AP that is currently serving the client device to communicate with the client device via a different primary channel.

However, if the channel is secondary, the performance monitoring module triggers a bandwidth optimization module that is also stored in the memory 504 and executed by the processor 502. The bandwidth optimization module determines a bandwidth-switching score to ascertain whether reducing the bandwidth without changing the primary channel will result in an increase in throughput. Specifically, the bandwidth optimization module may divide the interferer airtime estimate by the quotient of a prospective bandwidth for the AP and a current bandwidth for the AP. The prospective bandwidth is narrower than the current bandwidth. In other examples, the bandwidth-switching score may be calculated in some other manner.

If the bandwidth switching score satisfies a predefined score-threshold condition, the controller 500 sends a message to the AP to which the current bandwidth is allocated. The message indicates that the allocation for the AP has been changed from the current bandwidth to the prospective bandwidth (though the primary channel remains unchanged). In one example, the predefined score-threshold condition is that the bandwidth-switching score is greater than or equal to one. However, if the predefined score-threshold condition is not satisfied, the controller 500 refrains from modifying the current bandwidth that is allocated to the AP (e.g., because changing to the prospective bandwidth would not improve throughput).

The processor 502 also executes a time-domain adaptation module stored in the memory 504. The time-domain adaptation module tracks how much time has passed since the controller 500 last changed the bandwidth allocation for the APs that are controlled by the controller 500. For each of the APs, if less than the length of two channel-scan periods has passed since the bandwidth allocation for the AP has changed, the time-domain adaptation module prevents the controller 500 from changing the bandwidth allocation for that AP. When at least two channel-scan periods have passed, the time-domain adaptation module again allows changes to the bandwidth allocation for that AP. By operating in this manner, the time-domain adaptation module prevents oscillations between different channels or bandwidths.

In addition, when the time-domain adaptation module detects that two channel-scan periods have elapsed since the bandwidth allocation for an AP was modified, the time-domain adaptation module allows any bandwidth sections that were deallocated by the modification to be reallocated to that AP or to another AP controlled by the controller 500. This ensures that sections of bandwidth that were deallocated because of interference will be used again promptly once the interference subsides.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A system comprising:
   one or more processors; and
   a memory storing instructions that, when executed on the one or more processors, perform a set of actions detecting interference from a cellular network and one of mitigating or negating impact of the detected interference, the set of actions comprising:
   receiving, at a centralized controller from a wireless access point (AP) of a non-cellular wireless network, an interferer airtime estimate for a wireless channel shared by the cellular network and the non-cellular wireless network and a packet error rate (PER) for at least one client device in communication with the AP via the wireless channel;
   determining that the interferer airtime estimate satisfies a predefined airtime-threshold condition;
   determining that the PER satisfies a predefined PER-threshold condition;
   determining whether the wireless channel is a primary wireless channel or a secondary wireless channel;
   when the wireless channel is the secondary wireless channel, determining a bandwidth-switching score by dividing the interferer airtime estimate by a quotient of a prospective bandwidth for the AP and a current bandwidth for the AP, wherein the prospective bandwidth is narrower than the current bandwidth;
   modifying an allocation of wireless bandwidth for the AP to use for wireless communications based on the satisfaction of the airtime-threshold condition and the satisfaction of the PER-threshold condition; and
   upon determining that the bandwidth-switching score meets a predefined score-threshold condition, sending a message to the AP indicating that the allocation has been changed from the current bandwidth to the prospective bandwidth.

2. The system of claim 1, wherein the predefined score-threshold condition is that the bandwidth-switching score is greater than or equal to one.

3. The system of claim 1, wherein the wireless channel is the primary wireless channel, and wherein modifying the allocation of wireless bandwidth for the AP comprises deallocating the wireless channel from the AP and allocating a different wireless channel to the AP.

4. The system of claim 1, wherein the interferer airtime estimate is an exponential moving average of measurements collected at the AP over a channel-scan period of a predefined length.

5. The system of claim 4, wherein the set of actions further comprises:
   upon detecting that an amount of time equal to two multiplied by the predefined length channel-scan period has elapsed since the channel-scan period ended, reallocating a section of the wireless bandwidth that was deallocated by the modification.

6. The system of claim 1, wherein the predefined airtime-threshold condition is that the interferer airtime estimate indicates that an interferer was transmitting on the wireless channel during at least half of a channel-scan period for which the AP calculated the interferer airtime estimate.

7. A method comprising:
  detecting interference from a cellular network and one of mitigating or negating impact of the detected interference by:
    receiving, at a centralized controller from a wireless access point (AP) of a non-cellular wireless network, an interferer airtime estimate for a wireless channel shared by the cellular network and the non-cellular wireless network and a packet error rate (PER) for at least one client device in communication with the AP via the wireless channel;
    determining that the interferer airtime estimate satisfies a predefined airtime-threshold condition;
    determining that the PER satisfies a predefined PER-threshold condition;
    determining whether the wireless channel is a primary wireless channel or a secondary wireless channel;
    when the wireless channel is the secondary wireless channel, determining a bandwidth-switching score by dividing the interferer airtime estimate by a quotient of a prospective bandwidth for the AP and a current bandwidth for the AP, wherein the prospective bandwidth is narrower than the current bandwidth;
    modifying an allocation of wireless bandwidth for the AP to use for wireless communications based on the satisfaction of the airtime-threshold condition and the satisfaction of the PER-threshold condition; and
    upon determining that the bandwidth-switching score meets a predefined score-threshold condition, sending a message to the AP indicating that the allocation has been changed from the current bandwidth to the prospective bandwidth.

8. The method of claim 7, wherein the predefined score-threshold condition is that the bandwidth-switching score is greater than or equal to one.

9. The method of claim 7, wherein the wireless channel is the primary wireless channel, and wherein modifying the allocation of wireless bandwidth for the AP comprises deallocating the wireless channel from the AP and allocating a different wireless channel to the AP.

10. The method of claim 7, wherein the interferer airtime estimate is an exponential moving average of measurements collected at the AP over a channel-scan period of a predefined length.

11. The method of claim 10, wherein the method further comprises:
  upon detecting that an amount of time equal to two multiplied by the predefined length channel-scan period has elapsed since the channel-scan period ended, reallocating a section of the wireless bandwidth that was deallocated by the modification.

12. The method of claim 7, wherein the predefined airtime-threshold condition is that the interferer airtime estimate indicates that an interferer was transmitting on the wireless channel during at least half of a channel-scan period for which the AP calculated the interferer airtime estimate.

13. A non-transitory computer-readable storage medium storing a plurality of instructions executable by one or more processors, the plurality of instructions when executed by the one or more processors cause the one or more processors to:
  receive an interferer airtime estimate for a wireless channel shared by the cellular network and the non-cellular wireless network and a packet error rate (PER) for at least one client device in communication with the AP via the wireless channel;
  determine that the interferer airtime estimate satisfies a predefined airtime-threshold condition;
  determine that the PER satisfies a predefined PER-threshold condition;
  determine whether the wireless channel is a primary wireless channel or a secondary wireless channel;
  when the wireless channel is the secondary wireless channel, determine a bandwidth-switching score by dividing the interferer airtime estimate by a quotient of a prospective bandwidth for the AP and a current bandwidth for the AP, wherein the prospective bandwidth is narrower than the current bandwidth;
  modify an allocation of wireless bandwidth for the AP to use for wireless communications based on the satisfaction of the airtime-threshold condition and the satisfaction of the PER-threshold condition; and
  upon determining that the bandwidth-switching score meets a predefined score-threshold condition, send a message to the AP indicating that the allocation has been changed from the current bandwidth to the prospective bandwidth.

* * * * *